Oct. 1, 1968  R. J. HOLZINGER  3,404,089
METHOD OF EXTINGUISHING FIRE
Filed Aug. 20, 1964
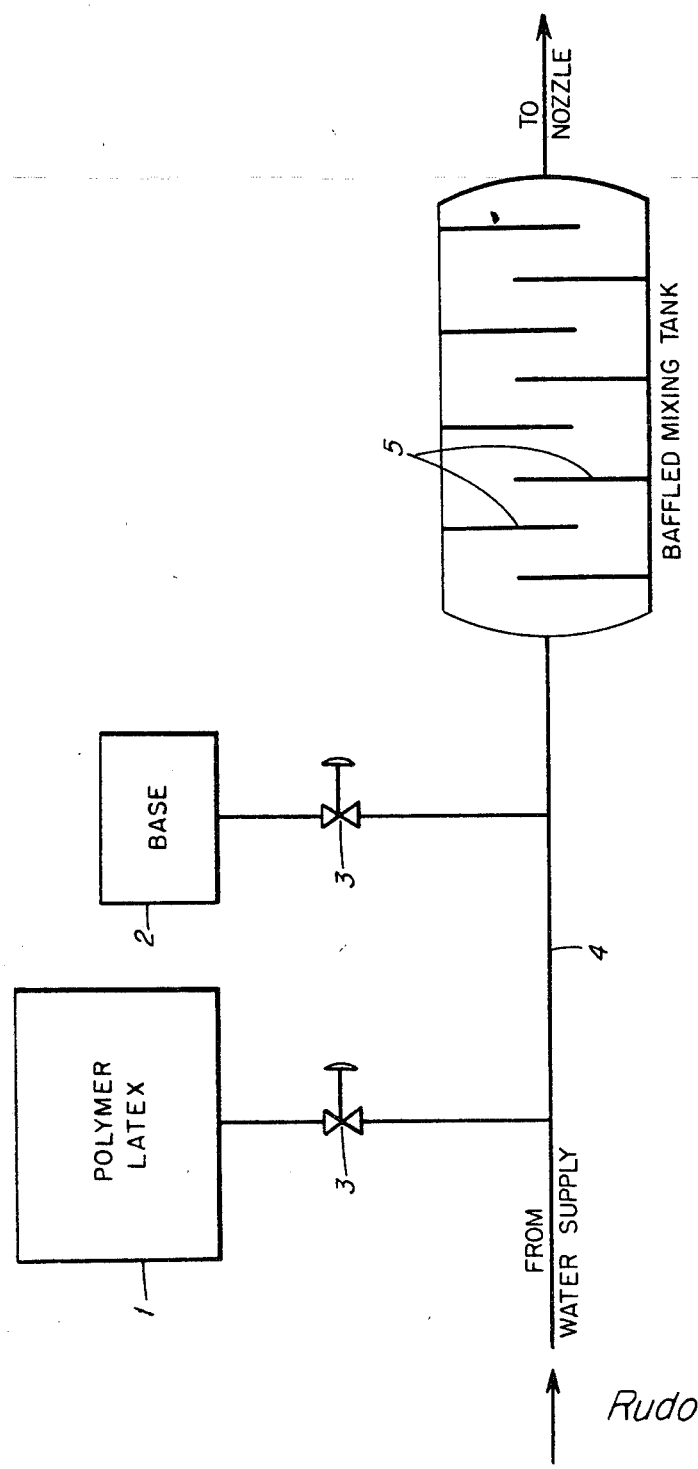
INVENTOR.
Rudolph J. Holzinger

10

15

20

25

30

35

40

45

50

55

60

3,404,089
METHOD OF EXTINGUISHING FIRE
Rudolph J. Holzinger, Haddonfield, N.J., assignor to Mobil Oil Corporation, a corporation of New York
Filed Aug. 20, 1964, Ser. No. 390,960
10 Claims. (Cl. 252—2)

The present invention relates to aqueous compositions which are effective for extinguishing fires and to a simple and effective process for preparing these compositions. In particular, the invention relates to the treatment of water so as to increase its effectiveness as a fire extinguishing agent.

The addition of various materials to water in order to enhance its effectiveness as a fire extinguishing agent is known. For example, wetting agents, opacifiers and thickeners are conventional additives of this type. In general, thickeners, which act to increase the viscosity of the water, are by far the most effective type of additive. It has been found, for example, that increasing the viscosity of water from 1 centipoise to about 5–10 centipoises by the use of thickeners increases its fire-fighting efficiency as much as 5–6 fold.

Typical thickeners include materials such as bentonite, sodium alginate and carboxymethyl cellulose. These materials, however, are in the form of granulated solids or powders and hence their proportioning and admixture with the water is often laborious and time-consuming. To obtain a satisfactory dispersion of these materials in water it is generally necessary to employ fairly vigorous mixing procedures for considerable periods of time. Because of these prolonged mixing periods the use of mixing equipment possessing large throughputs is necessary in order to provide a sufficient supply of thickened water at the scene of the fire. In addition, the granular nature of these thickening agents and the relatively high viscosities involved increase the problems of lumping and necessitate the use of fairly powerful mixing apparatus.

Because of the above considerations, the thickening agents heretofore employed are generally admixed with water at a location other than the place of ultimate use. As a result, the finished product, that is, the thickened water often must be transported to fairly remote areas such as to woodland or mountain fires. The problems of logistics inherent in this type of operation, of course, have greatly restricted the use of such thickened water compositions.

According to the present invention I have found that by employing a specific type of thickening agent, it is possible to provide aqueous fire-fighting compositions possessing increased viscosity and good fire-extinguishing ability which compositions may be readily prepared at the location of the particular fire.

It is therefore an object of the present invention to provide aqueous fire-fighting compositions containing a specific type of thickening agent. Another object is to provide a simple and effective process for preparing these fire-fighting compositions.

Further objects of the invention and some advantages thereof will become apparent hereinafter.

According to the present invention it has been found that small amounts of two low viscosity liquids can be reacted in the presence of water to effect the in-situ thickening of the water thereby providing improved fire-fighting compositions in a simple and efficient manner.

The figure shows in a schematic manner a suitable method for preparing thickened water compositions in accordance with the present invention.

I have found that the foregoing improved results are achieved by reacting a high molecular weight polymer emulsion with a basic liquid in the presence of the water to be thickened.

This polymer emulsion may, in general, be an emulsion of a polymeric material containing free acidic groups and possessing sufficient molecular weight to cause upon reaction with the basic liquid the desired increase in the viscosity of the water. Such polymers, either homopolymers or copolymers, should have a molecular weight from about one million upward preferably from about five million. The upper molecular weight of the polymer is not critical since the water-based emulsions containing extremely high molecular weight polymers possess surprisingly low viscosities and are still easily handled and mixed.

The concentration of the polymer solids in the emulsion can vary considerably. Thus, polymer emulsions containing solids in amounts from about 1 to about 60 weight percent, preferably from about 2 to about 20 weight percent are suitable. These emulsions may be further characterized as having viscosities (Brookfield at 12 r.p.m.) in the range from about 1 to about 100 centipoises.

The polymer emulsions used herein contain free acid groups such as carboxylic or sulfonic acid groups. Suitable polmers include high molecular weight homopolymers and copolymers of ethylenically unsaturated monomers containing carboxy or sulfonic acid groups such as unsaturated aliphatic monocarboxylic acids exemplified by acrylic acid, methacrylic acid and monoalkenyl aromatic sulfonates exemplified by styrene sulfonic acids, $\alpha$-methylstyrene sulfonic acids etc.

Polymer emulsions containing copolymers of acrylic or methacrylic acids with acrylate or methacrylate esters containing at least about 40 mol percent of the acid monomer are preferred.

The preparation of polymers possessing the above-described characteristics is known in the art. For example, the acrylic or methacrylic acid polymers may be conveniently prepared using conventional emulsion polymerization processes.

The second liquid component, i.e., the basic liquid, may be selected from aqueous solutions or dispersions of suitable bases including alkali metal hydroxides, alkaline salts, nitrogen-containing organic bases such as amines, or mixtures of any of the foregoing. Some typical examples of such bases include sodium, potassium or ammonium hydroxides; alkanolamines such as triethanol amine; alkali borates such as sodium borate; alkali phosphates such as trisodium or diammonium phosphate; silicates such as sodium or potassium silicate. The basic material may be selected to impart additional benefits such as water softening or enhanced fireproofing properties. Likewise, the use of organic sequestering or chelating agents such as the sodium salts of ethylenediamine tetraacetic acids to combat possible effects of water hardeners is contemplated.

The relative proportions of the polymer emulsion and basic liquid employed should be selected so as to attain maximum viscosity for a given concentration of emulsion, or more particularly for a given concentration of polymer solids. In general, the base may be used in amounts to provide from about 0.2 to about 1, preferably from about 0.5 to about 1 equivalent of base with respect to acidic polymer. Greater amounts of base may, of course, be used to over neutralize the polymer emulsions, but generally such excesses are not necessary.

It is a significant advantage of the present invention that the fire-fighting effectiveness of large quantities of water are improved using very small amounts of polymer emulsion and liquid base. Thus, the addition of polymer solids in amounts as low as about 0.002 weight percent results in significant increases in the viscosity of the water. The use of the polymer emulsions in amounts sufficient to introduce from about 0.05 to about 0.5 weight percent is preferred although in some situations requiring higher viscosities larger amounts may be used. The proportions of base introduced depend on the amount of polymer solids and are generally within the proportions mentioned hereinabove.

Almost any method suitable for proportioning and intimately mixing two low viscosity liquids is suitable for use in blending the polymer emulsion and base in the presence of water. It is an advantage of this invention that the polymers can be used in the form of an easily handled free-flowing emulsion. The fluid characteristic and low viscosity of the two liquid reactants also permit the use of inexpensive proportioning and mixing equipment.

The mixing is conducted at ambient temperatures although heating of the reaction mixture is suitable in some instances.

The particular mixing times employed will depend, among other things, on the type of equipment used. In general, mixing times sufficient to insure a thorough admixture of the reactants and the water should be employed. Mixing times as low as 15 seconds are suitable. Indeed, the present invention is particularly advantageous in that the time required for mixing the thickening agents is extremely short and the viscosity increase in the water is quickly achieved. Thus, continuous rather than batch-type procedures may be employed in the preparation of the aqueous fire-fighting compositions.

Moreover, the instant fire-fighting compositions may be prepared in the actual fire-fighting equipment. For example, a pumper truck rating at 500 gallons per minute containing a mixing tank of about 125 gallons would be able to provide a 15 second mixing time using the thickeners of the present invention. The necessary agitation can be provided by a suitable mixing device or a baffle arrangement in the mixing tank to take advantage of the turbulence derived from by the high velocity of the incoming water stream.

An example of a suitable mixing arrangement of this type is shown in the accompanying figure. The polymer emulsion in the form of a milky liquid (latex) from container 1 and aqueous base material from container 2 are added to the water stream flowing in line 4. The components are then conducted to a baffled mixing tank containing baffles 5, wherein the thickening agents and water are thoroughly admixed and from which the thickened water may be passed to a nozzle.

In addition to possessing increased ease of preparation and effective fire-extinguishing capabilities, the compositions of the present invention are also advantageous in other respects. The instant thickeners act to suppress turbulent flow conditions and decrease pressure drop. These characteristics are particularly important when using long hose lines.

The invention will be further clarified by consideration of the following specific embodiments.

Examples 1–5

The aqueous emulsion used herein contains about 20 weight percent solids of a copolymer of acrylic acid and hydroxymethyl acrylate possessing about 66.6 mol percent acrylic acid units, about 33.3 mol percent hydroxymethylacrylate units and having a molecular weight of about 15 million. The polymer emulsion in the form of a milky liquid (latex) having a viscosity (Brookfield, 12 r.p.m. at 25° C.) of about 50 cps., is added to an open container partially filled with water. Dilute aqueous sodium hydroxide (10%) is then added to the container while stirring. A thickened aqueous solution is obtained in less than one minute.

The particular proportions of the various ingredients employed and the viscosity at room temperature (about 25° C.) of the aqueous composition obtained in each of the examples are shown in the following Table I.

TABLE I

| Example No. | 1 | 2 | 3 | 4 | 5 |
|---|---|---|---|---|---|
| Polymer solids | 0.08 | 0.08 | 0.08 | 0.08 | 0.08 |
| Sod. hydroxide | 0.0065 | 0.013 | 0.0195 | 0.0265 | 0.0294 |
| Water, to make | 100.0 | 100.0 | 100.0 | 100.0 | 100.0 |
| Alkali equivalent | 0.25 | 0.5 | .75 | 1.0 | 1.25 |
| Brookfield viscosity, 12 r.p.m., cps. at room temperature | 3.8 | 8.6 | 7.4 | 7.4 | 4.4 |

It will be noted from the above table that aqueous solutions possessing viscosities in the preferred range of 5–10 cps. are obtained using alkali equivalents from 0.5 to 1, and that the desired thickening of the water is achieved using total solids concentrations of less than 0.1%. In practice, this means that large amounts of water can be treated with relatively small amounts of the specific thickening agents to thereby produce using simple and efficient techniques improved fire-fighting compositions.

It will be appreciated that many variations and modifications may, of course, be practiced without departing from the scope and spirit of the present invention.

Having thus described the invention, what I desire to secure and claim by Letters Patent is:

1. A method of extinguishing fire which comprises applying to the flames of the fire a thickened, aqueous fluid composition, prepared by reacting
    (a) an aqueous emulsion containing water and from 1% to about 60% by weight of a polymer of an acrylic acid selected from the group consisting of acrylic acid polymer, methacrylic acid polymer, copolymers of the monomers thereof with acrylic acid ester and copolymers of the said monomers with methacrylic acid ester, styrene sulfonic acid polymer and α-methyl styrene sulfonic acid polymer, said polymer having free acid groups and a molecular weight of at least 1 million, and
    (b) from about 0.5 to about 1.0 equivalent per acid group equivalent of said polymer of a base selected from the group consisting of alkali metal and ammonium hydroxides, alkali metal and ammonium basic inorganic salts, amines, and mixtures thereof, to produce a water-soluble product,
said reaction being conduction in the presence of a sufficient quantity of water to produce a concentration of polymer solids in the said thickened aqueous composition of from about 0.002% by weight to about 0.5% by weight.

2. The method of claim 1 wherein the reaction is carried out in a mixing tank attached to equipment capable of applying the said fluid composition to the flames of a fire shortly thereafter.

3. The method of claim 1, wherein the concentration of polymer in the emulsion is from 2% to 20% by weight.

4. The method of claim 1, wherein the polymer is an acrylic acid polymer.

5. The method of claim 1, wherein the polymer is a copolymer of acrylic acid and hydroxymethyl acrylate.

6. The method of claim 1, wherein the polymer has a molecular weight of at least 5 million.

7. The method of claim 1, wherein the base is sodium hydroxide.

8. The method of claim 5, wherein the copolymer contains at least 40 mol percent of the acrylic acid polymer.

9. The method of claim 5, wherein the copolymer contains about 66.6 mol percent of acrylic acid polymer and about 33.3 mol percent of hydroxymethyl acrylate.

10. The method of claim 9, wherein the polymer has a molecular weight of about 15 million.

References Cited

UNITED STATES PATENTS

| 3,229,769 | 1/1966 | Bashaw et al. | 117—136 X |
| 2,551,919 | 5/1951 | Williamson et al. | 252—2 |
| 2,640,039 | 5/1953 | Williams | 260—23 |
| 2,921,930 | 1/1960 | Suhrie | 260—78.5 |
| 3,227,688 | 1/1966 | Kern et al. | 260—67 |

FOREIGN PATENTS

| 1,281,103 | 1/1961 | France. |

OTHER REFERENCES

"Chemical Week," vol. 89, No. 14, Oct. 7, 1961, pp. 39–40.

"Carbopol," 934, 1957, B. F. Goodrich Chemical Co., pp. 1, 3, 6 and 15.

LEON D. ROSDOL, *Primary Examiner.*

MAYER WEINBLATT, *Assistant Examiner.*